United States Patent
Burr et al.

(10) Patent No.: US 11,122,819 B2
(45) Date of Patent: *Sep. 21, 2021

(54) ANIMAL FEED BLOCKS AND METHODS AND SYSTEMS FOR THEIR PRODUCTION

(71) Applicant: PURINA ANIMAL NUTRITION LLC, Arden Hills, MN (US)

(72) Inventors: Michael S. Burr, Marthasville, MO (US); Ronald R. Scott, St. Charles, MO (US); James Christopher Forcherio, Pacific, MO (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,618

(22) Filed: May 21, 2020

(65) Prior Publication Data

US 2020/0281228 A1 Sep. 10, 2020

Related U.S. Application Data

(63) Continuation of application No. 14/733,339, filed on Jun. 8, 2015, now Pat. No. 10,694,769.

(51) Int. Cl.

| | |
|---|---|
| *A23K 40/20* | (2016.01) |
| *A23K 20/163* | (2016.01) |
| *A23K 20/158* | (2016.01) |
| *A23K 20/20* | (2016.01) |
| *A23K 50/10* | (2016.01) |
| *A23K 20/174* | (2016.01) |
| *A23K 20/147* | (2016.01) |

(52) U.S. Cl.
CPC ............ *A23K 40/20* (2016.05); *A23K 20/163* (2016.05); *A23K 50/10* (2016.05); *A23K 20/147* (2016.05); *A23K 20/158* (2016.05); *A23K 20/174* (2016.05); *A23K 20/30* (2016.05)

(58) Field of Classification Search
CPC .. A23K 20/147; A23K 20/158; A23K 20/163; A23K 20/174; A23K 20/30; A23K 40/20; A23K 50/10
See application file for complete search history.

(56) References Cited

U.S. PATENT DOCUMENTS

| | | | |
|---|---|---|---|
| 4,735,809 A | | 4/1988 | Donovan et al. |
| 5,482,729 A | * | 1/1996 | McKenzie ............ A23K 40/00 426/635 |
| 6,440,478 B1 | | 8/2002 | Benton et al. |
| 10,694,769 B2 | * | 6/2020 | Burr ...................... A23K 20/163 |
| 2003/0152689 A1 | | 8/2003 | Ethington et al. |
| 2004/0018288 A1 | | 1/2004 | Westberg |
| 2014/0213656 A1 | | 7/2014 | Tokubuchi et al. |
| 2014/0289906 A1 | | 9/2014 | Althoff et al. |
| 2014/0323656 A1 | | 10/2014 | Hu et al. |
| 2014/0345344 A1 | | 11/2014 | Sanders |

OTHER PUBLICATIONS

Bauer, et al., "Influence of Pressed Beet Pulp and Concentrated Separator by-product on intake, gain, efficiency of gain, and carcass composition of growing and finishing beef steers", Journal of Animal Sciences, vol. 85, pp. 2290-2297, 2007, American Society of Animal Sciences.

Greenwood, et al., "Effects of Base Ingredient in Cooked Molasses Blocks on Intake and Digestion of Prairie Hay by Beef Steers", Journal of Animal Science, vol. 78, pp. 167-172, 2000, American Society of Animal Science.

Kellems, "Digestibility Comparison of Three Dried Beet Pulps Containing Various Levels of Molasses and Concentrated Separator By-Product", Proceedings, Western Section, American Society of Animal Sciences, vol. 45, 1994.

Lawler-Neville, et al., "Effects of Concentrated Separator by-product (desugared molasses) on Intake, Site of Digestion, Microbial Efficiency, and Nitrogen Balance in Ruminants Fed Forage-Based Diets", Journal of Animal Sciences, vol. 84, pp. 2232-2243, 2006, American Society of Animal Sciences.

Loe, et al., "Effect of Dietary Inclusion of Concentrated Separator By-Product and Weaning Management on Performance of Newly Received Feedlot Steers", Animal Feed Science and Technology, vol. 100, pp. 43-52, 2002, Elsevier.

Loest, et al., "Supplemental Betaine and Peroxide-Treated Feather Meal for Finishing Cattle", Journal of Animal Sciences, vol. 80, pp. 2234-2240, 2002, American Society of Animal Science.

Wiedmeier, et al., "Effects of Concentrated Separator Dried Beet Pulp on Nutrient Digestibility, Milk Production, and Preference of Holstein Cattle", Journal of Dairy Science, vol. 77, pp. 3051-3057, 1994.

* cited by examiner

*Primary Examiner* — Walter A Moore
(74) *Attorney, Agent, or Firm* — Dorsey & Whitney LLP

(57) ABSTRACT

Low moisture feed blocks deliver supplemental nutrients to animals and are free or substantially free of molasses by using concentrated separator by-product as a molasses replacement. A premixture of concentrated separator by-product and added sugar may be pH-adjusted and concentrated to a high solids content. The premixture may be combined with dry components to form an admixture that is poured into a vessel and allowed to naturally cool and harden into the supplemental feed block.

20 Claims, No Drawings

ANIMAL FEED BLOCKS AND METHODS AND SYSTEMS FOR THEIR PRODUCTION

CROSS-REFERENCE TO RELATED APPLICATIONS

This application is a continuation of U.S. patent application Ser. No. 14/733,339 filed on Jun. 8, 2015, now U.S. Pat. No. 10,694,769, the disclosure of which is incorporated herein, in its entirety, by this reference.

TECHNICAL FIELD

The present disclosure relates to animal feed supplements and methods and systems for their production, and more particularly, relates to animal feed blocks containing concentrated separator by-product as a molasses-replacement and methods and systems for their production.

BACKGROUND

Supplemental animal feedstuffs fortified with nutritive supplements have been developed in block form to permit free choice feeding and reduce the labor required for mixing the nutritive supplement with the animals' feed ration. Such nutritive supplement blocks may be of three types: poured blocks, low moisture blocks or pressed blocks.

Poured blocks require a curing agent for hardening, which may include magnesium oxide or another component that reacts in the presence of moisture. Upon pouring a liquefied nutrient supplement into a vessel, the mixture non-reversibly cures over a period of time, typically 24 hours. Skoch et. al., U.S. Pat. No. 4,171,385 describe molasses-based feed blocks wherein magnesium oxide is employed as an ingredient to form a pourable heated composition that self-hardens after cooling into a solid, weather resistant feed block suitable for ruminant consumption. Such feed blocks have the advantage of ease of manufacture, since pourability is provided and hardening of the block occurs without the need to evaporate water, leading to lower manufacturing costs and lower energy consumption in the finished product compared to blocks where water evaporation is necessary.

Pressed blocks are typically formed by heating and adding steam to dry feed under high pressure conditions. The pressure exerted on the supplemental animal feedstuffs and binders such as lignin are responsible for binding the feed components together and enables the block to retain its shape.

Low moisture blocks require dehydration or moisture removal for hardening. This type of block is also referred to as a cooked tub because the nutritive supplement mixture is "cooked" and upon pouring into a vessel, e.g., a tub, the contents are allowed to cool and harden into a block. Such blocks contain molasses as a primary component at a level of 40 wt % or higher.

SUMMARY

Implementations provide low moisture animal feed supplements and methods of making low moisture animal feed supplements in block form, which contain concentrated separator by-product as a molasses-replacement.

Some implementations provide methods of making a low moisture feed supplement block, which is free of molasses. Methods may involve forming a premixture of concentrated separator by-product and added sugar; adjusting a pH of the premixture from about 7.0 to about 11.0; concentrating the premixture to a solids content of at least 90 percent by weight; forming an admixture by combining the concentrated premixture with dry components; pouring the admixture into a vessel; and allowing the poured admixture to cool to ambient temperatures thereby hardening into a feed block. In certain implementations, the combination of concentrated separated by-product and added sugar serves as a molasses-replacement and the feed block is free of molasses.

In additional or alternative implementations, a method of making a low moisture feed supplement block may involve the preceding steps of forming the premixture, pH-adjustment, concentration to a high solids content, forming an admixture by combining the concentrated premixture with dry components, pouring the admixture; and allowing the poured admixture to cool to ambient temperatures thereby hardening into a feed block, and in such variations and alternatives, the concentrated separator by-product in the feed block accounts for more of the feed block than any other component.

In further implementations and alternatives, the added sugar may include a non-reducing sugar. In this instance, the step of cooling the mixture may be to a temperature of 185° F. prior to pouring into the vessel. For instance, the non-reducing sugar may include sucrose.

In further implementations and alternatives, the added sugar may include a reducing sugar. In this instance, the step of cooling the mixture may be to a temperature of 155° F. prior to pouring into the vessel. For instance, the reducing sugar may include one or more of fructose, glucose or lactose.

In further implementations and alternatives, the step of concentrating the premixture involves heating the premixture to a temperature of about 230° F. to about 245° F. For instance, the premixture may be heated under vacuum conditions to reach the desired temperature.

According to another implementation, a feed block free of molasses includes condensed separator by-product as a primary component and at least one sugar selected from sucrose, fructose, galactose or lactose, where the at least one sugar accounts for about 5 to 30 wt % of the total weight of the feed block.

In addition or alternatively in the methods of making the feed block or in the feed block itself; the concentrated separator by-product accounts for more of the feed block than any other component; the concentrated separator by-product is present in the feed block at about 45 to about 60 wt %; the feed block contains about 5 to 30 wt % added sugar; and/or the feed block is free of curing agents.

DETAILED DESCRIPTION

Animal feed supplement blocks containing concentrated separator by-product as a molasses-replacement are provided herein. These blocks may be provided to animals in free choice settings to supplement the animal's diet with nutrients including protein, fat, vitamins and minerals.

In prior approaches, nearly all feed supplement blocks were molasses-based and contained cane or beet molasses. Cane molasses is a by-product of processing sugar cane and is commonly used in feed supplement blocks due to its stability over prolonged storage periods and because its viscosity drops significantly with the addition of urea. In addition, animals find cane molasses palatable but tend to not over-consume blocks made from this type of molasses. Beet molasses is similar to cane molasses except that it results from the processing of sugar beets to yield granulated sugar. It is typically lower in viscosity than cane molasses but slightly higher in sugar content. Similar to cane molasses, animals readily accept blocks made from beet molasses.

Cane and beet molasses contain at least 60 weight percent (wt %) sugar on a dry matter basis. This high sugar content makes molasses palatable to the animals and therefore particularly attractive for incorporation into feed blocks. In addition, molasses contains at least 75 percent of total digestible nutrients, on a dry matter basis. Feed blocks produced from molasses therefore are palatable without the need to include additional sugar and include high levels of digestible nutrients resulting in animals benefiting by ingestion of the feed blocks.

Molasses-based feed blocks typically contain a mixture of nutrients such as protein, fat, vitamins and minerals from a variety of sources. In some instances, these nutrients are sourced from concentrated separator by-product, which is a by-product resulting from the refinement of beet molasses. Concentrated separator by-product and beet molasses differ from one another in that a portion of the sugars from beet molasses are removed in the production of the concentrated separator by-product. Compared to beet molasses, such processing results in the concentrated separator by-product containing sugar at relatively lower levels, e.g., less than 45 wt %, e.g., about 43 wt %, on a dry matter basis and relatively lower levels of total digestible nutrients of about 65 wt %, on a dry matter basis. Due to these lower levels of sugar and total digestible nutrients, concentrated separator by-product has been included in the feed blocks only at relatively low levels in order to avoid problems with palatability and to avoid delivering supplements with low nutritional value, as being contrary to the purpose of offering the animal free choice nutrients to supplement the animal's diet. In addition, concentrated separator by-product has been used to increase the pH of some blocks, and high inclusion rates has been contraindicated due to the risk of making the alkalinity of the blocks too high.

It has been discovered that concentrated separator by-product, however, is usable as a direct replacement for molasses in animal feed blocks. Accordingly, feed supplement blocks of the present disclosure contain concentrated separator by-product as a primary component and are free of or substantially free of molasses. By free of molasses, it is meant that the feed blocks contain no molasses. By substantially free of molasses, it is meant that the blocks contain less than 2 wt % molasses on a dry matter basis. In some implementations and alternatives, the feed supplement blocks may include the concentrated separator by-product as a partial replacement for molasses. For instance, the concentrated separator by-product may serve as the primary component, while molasses may be present at a level up to about 30 percent.

Feed Supplement Block Composition:

The feed supplement blocks of the present disclosure may include concentrated separator by-product as a primary component. By primary component, it is meant that the concentrated separator by-product accounts for more of the feed block than any other component. Concentrated separator by-product may account for about 45 to 60 wt %, about 45 to 50 wt %, about 50 to 60 wt %, or about 55 to 60 wt % of the feed block on a dry matter basis. The concentrated separator by-product may contain about 16 to 20 wt % crude protein, less than 1 wt % fat, about 70 to 78 wt % organic matter, about 60 to 70 wt % total digestible nutrients, and about 40 to 45 wt % sugars on a dry matter basis.

The feed supplement blocks additionally includes at least one sugar source and may include other nutrients such as protein, fat, vitamins and minerals.

The at least one sugar source delivers additional nutrients to the animal. Sugar additionally assists in hardening of the block, which is useful for intake control of the finished products. Examples of suitable sugar sources include sucrose, fructose (e.g., high fructose corn syrup), glucose, galactose, maltose, lactose, maltose, galactose or combinations. For instance, the non-reducing sugar sucrose may be a preferred sugar according to certain implementations, while in others the short chain reducing sugars of fructose, glucose and/or lactose may be preferred sources of sugar. Other suitable sugar sources include sugar-containing components, and these may additionally or alternatively include honey, sugarcane, corn syrup, sugar beet, fruit extracts, or combinations. Alternatively, the feed blocks of the present disclosure may be free of any of the preceding sugar sources.

The sugar source(s) may be present in a pre-mixture of the concentrated separator by-product. For instance, the sugar source(s) may account for at least about 2 to 15 wt % of the pre-mixture, prior to dehydration, discussed herein. In the finished feed supplement block, the sugar source(s) may be present at about 1 wt % to about 30 wt %, about 1 wt % to about 15 wt %, about 1 wt % to about 10 wt %, about 5 wt % to about 15 wt %, about 10 wt % to about 20 wt %, about 10 wt % to about 25 wt % or about 10 wt % to about 30 wt %, or up to about 15 wt % on a dry matter basis.

Protein in the feed supplement blocks may be derived from the concentrated separator by-product as well as additional protein sources, which may include, but are not limited to grain-based by products (e.g., distillers grains, corn steep liquor, condensed distillers solubles, and corn gluten feed), alfalfa, wheat midds, corn (e.g., meal) cottonseed (e.g., hulls or meal), soy bean (e.g., flakes, hulls or meal), rape seed meal, canola meal, sunflower seed meal, palm kernel oil meal, sesame oil meal, perilla oil meal, dried blood, meat (e.g., meat meal), fish (e.g., meal or solubles), egg. In addition, non-protein nitrogen sources that may be used in the feed supplement blocks may include, but are not limited to urea, biuret and ammonia.

Protein and non-protein nitrogen sources in the feed supplement block may be present at about 10 to 40 wt % on a dry matter basis, or about 20 to 30 wt % on a dry matter basis.

Fat in the feed supplement blocks may include fats, greases or oils derived from animal or plant sources. Examples of suitable fat components include animal fat such as beef tallow, beef stearin, yellow grease, choice white grease; vegetable oils such as palm stearin, soybean oil, flaxseed oil, sunflower oil, or cottonseed oil; hydrogenated vegetable oils; nut oils; seed oils; fish oils; beef fat; chicken fat, and combinations.

Fat may be present in the feed block at about 2 to 15 wt % or about 2 to 10 wt % on a dry matter basis.

Moisture in the feed supplement blocks may be present at about 2 to about 5 wt % of the block.

Other components in the feed block may include, but are not limited to, vitamins, minerals, pH adjusters, palatants (e.g., sugar alcohol), feed nuggets, clay, medicaments, antibiotics and insecticides. Vitamins and minerals may include, but are not limited to, calcium (Ca), phosphorous (P), salt (NaCl), potassium (K), magnesium (Mg), iodine (I), iron (Fe), cobalt (Co), manganese (Mn), sulfur (S), copper (Cu), selenium (Se), zinc (Zn), vitamins A, D and E. Suitable pH adjusters may adjust the pH of compositions or mixtures to an acidic, a neutral or an alkaline pH, Suitable pH adjusters include but are not limited to sodium hydroxide or other high pH components such as additional concentrated separator by-product or beet filtrate.

Methods of Producing Low Moisture Feed Blocks:

The feed supplement blocks of the present disclosure may be prepared by forming a premixture, adjusting a pH of the premixture, concentrating to a high solids level, blending with additional components to form an admixture, optionally cooling the admixture, and pouring the admixture into tubs where it hardens into a low moisture feed supplement block. The feed supplement blocks differ from poured blocks in that curing agents (e.g., magnesium oxide) and lignin binders are not required for the feed supplement blocks to harden. Rather, the high solids level of the admixture allows the feed block to harden upon cooling to ambient temperatures and the feed blocks may be free of curing agents and/or lignin binders. The methods described below are intended to be representative examples of useful embodiments thereof.

The premixture may be formed by mixing concentrated separator by-product with one or more sugars. The concentrated separator by-product may serve as the main source of liquid in the premixture. The sugar may be introduced in granular or liquid form. In some implementations, a non-reducing sugar such as sucrose may be preferred for the premixture. Non-reducing sugars do not undergo a Maillard reaction (e.g., non-enzymatic browning in the presence of amino acids) or Streckers degradation (e.g., the conversion of an $\alpha$-amino acid into an aldehyde containing the side chain) during subsequent processing steps and may require cooling to a lesser extent compared to the use of reducing sugars. Alternatively, reducing sugars such as fructose, glucose, lactose or combinations, may be used in the premixture. Although these sugars have the potential to undergo the Maillard reaction or Streckers degradation, controlling operating parameters of subsequent processing steps may avoid such reactions. The added sugar may account for about 2 wt % to about 15 wt %, or about 7.5 wt %, of the premixture prior to dehydration. In addition, the premix may contain a pH adjuster and fat. The premixture may be agitated to increase uniformity of the composition.

The premixture may have a pH of about 6.0 to about 8.0 and may be adjusted upward to a pH of about 7.5 to 11.0 to facilitate hardening and solidification of the block. For instance, the pH may adjusted by adding an alkaline solution to 7.0 to 10.0, 8.0 to 11.0, 7.0 to 9.0, 7.0 to 8.0, 8.0 to 9.0, 9.0 to 10.0, 10.0 to 11.0. Sources of alkalinity may include, but are not limited to, sodium hydroxide (NaOH), magnesium hydroxide (MgOH), calcium oxide (CaO), and sodium hydrogen carbonate (e.g., sodium bicarbonate ($NaHCO_3$)) as well as feed components with high alkalinity such as concentrated separator by-product and/or beet filtrate.

The premixture may be blended, pH adjusted and concentrated to a high solids content using a vessel such as a batch kettle. Concentration may be to at least 90 wt % solids, at least 95 wt % solids, and preferably to about 98 wt % solids. In addition or alternatively, the vessel may be a recirculating vessel that recirculates liquid from the bottom to the top of the vessel to provide a uniformly heated premixture. The temperature of the premixture may be raised up to about 200° F. to about 260° F., about 230 to about 240° F., about 230 to 245° F. or about 232° F. These temperatures may be reached using vacuum pressure, such as by sealing the vacuum kettle and subjecting the contents to vacuum conditions. As the vacuum level is increased, the temperature at which the premixture boils decreases. In some implementations, a vacuum pressure of about 21 inHg may be preferred. In some implementations, concentrating at a temperature below 240° F. may be preferred, and this temperature may be relatively low compared to typical cooking temperatures used in the production of molasses-based feed blocks, which requires heating to at least 240° F. or higher.

The high solids premixture may be admixed with other feed block components such as sources of additional protein, sugar, vitamins, minerals, medicaments and/or insecticides. The added components may be dry components to ensure the level of solids in the admixture remains high. For instance, a dry premix containing any or all of these components may be admixed with the high solids premixture. Alternatively, the admixture may be free of any of the components.

Where the premixture contains fat and/or a pH adjuster, additional fat and/or pH adjusters may optionally be added to the high solids premix. Typically, the pH of the premixture is substantially the same as the pH of the admixture.

The admixture may optionally be cooled prior to pouring the admixture into containers. For admixtures containing non-reducing sugars, cooling may be to 185° F. or below. For admixtures containing reducing sugars, cooling may be to 156° F. or below so as to avoid reduction of the sugars in the Maillard reaction or Streckers degradation. For instance, cooling may be conducted through the use of a cooling belt where the admixture is deposited on a moving belt while water is sprayed onto one side of the belt, which enables admixture on an opposite side of the belt to cool without the addition of moisture. In addition or alternatively, the admixture may be allowed to cool using a jacketed vessel that circulates cold water within the jacket which enables rapid cooling without adding moisture to the admixture.

The admixture may be poured into containers, such as tubs, where the admixture is allowed to harden. The containers may hold about 50 to about 250 lbs. of the admixture. Once in the container, the admixture continues to cool to ambient temperatures. Typically, the admixture is free of curing agents and lignin binders present in poured blocks and pressed blocks, respectively, and the admixture does not undergo an exothermic or curing reaction as it hardens. Rather, the high solids content and sugar present in the admixture enable the composition to harden into a block form. In addition, the pH of the admixture may be about 7.0 to 11.0, which enables the admixture to harden efficiently.

The finished feed supplement blocks may have a hardness comparable to molasses-based products. The level of total sugar using the blend of concentrated separator by-product and sugar may be lower than when either cane or beet molasses is used as the liquid composition for the manufacturing process. In addition, by using concentrated separator by-product as a molasses replacement, the level of sugar in the feed supplement blocks may be controlled, which enables the finished product to have a desired harness.

The methods described herein that use sucrose as a source of sugar additionally allows the cooling of the feed block to start at a higher temperature, e.g., about 185° F. to 165° F. or about 185° F. to 175° F., because the majority of the sugars in the product are sucrose and not reducing sugars such as fructose and glucose, thereby avoiding the Maillard reaction and subsequent Streckers degradation reactions that otherwise cause carbon dioxide formation resulting in foaming and/or expansion of the finished blocks when they are poured at temperatures above 154° F. Alternatively, when the manufacturing process has adequate capacity to cool the blend prior to packaging, e.g., using an elongated cooling belt that allows more cooling time of the admixture prior to pouring, other sugar sources such as reducing sugars like fructose or glucose can be used in place of sucrose for the process.

While additives such as condensed distillers solubles and corn steep liquor may be added during production of the blocks, such as during processing of the premixture, during heating (e.g., as additional dry matter), or as an additive in the admixture, these additives do not behave like concentrated separator by-product and are unsuitable for use as the primary liquid component in the production of the blocks. Particularly, these additives may provide excessive amounts of moisture, or alternatively, at low moisture levels, may be so thick as to make mixing and pouring difficult. In addition, these components have a relatively low pH, which results in problems in adjusting the pH up to required levels for proper hardening.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations should not be construed as limiting.

Similarly, it should be appreciated that in the foregoing description of example embodiments, various features are sometimes grouped together in a single embodiment, FIGURE, or description thereof for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

While the present disclosure has been particularly shown and described with reference to embodiments thereof, it will be understood by those skilled in the art that various other changes in the form and details may be made without departing from the spirit and scope of the disclosure.

What is claimed is:

1. A method of making a feed block, comprising:
forming a premixture of concentrated separator by-product and added sugar;
adjusting a pH of the premixture to a first pH with one or more first pH adjusters, wherein the first pH is about 7.0 to about 11.0;
concentrating the premixture;
forming an admixture by combining the concentrated premixture with dry components, wherein forming the admixture includes adding one or more second pH adjusters such that the admixture exhibits a second pH that is about the same as the first pH; and
depositing the admixture into a vessel where the deposited admixture hardens at ambient temperatures to thereby form the feed block.

2. The method of claim 1, wherein the concentrated separator by-product accounts for about 45 to about 60 wt. % of the feed block on a dry matter basis.

3. The method of claim 1, wherein the concentrated separator by-product accounts for more of the feed block than any other component on a dry matter basis.

4. The method of claim 1, wherein the sugar accounts for about 10 to about 30 wt. % of the feed block on a dry matter basis.

5. The method of claim 1, wherein the sugar accounts for up to about 15 wt. % of the feed block on a dry matter basis.

6. The method of claim 1, wherein the sugar includes non-reducing sugars.

7. The method of claim 1, wherein at least one of the one or more first pH adjusters or the one or more second pH adjusters includes one or more of sodium hydroxide, magnesium hydroxide, calcium oxide, sodium hydrogen carbonate, or beet filtrate.

8. The method of claim 1, wherein the feed block is free of molasses.

9. The method of claim 1, wherein the feed block is substantially free of molasses.

10. The method of claim 1, wherein molasses accounts for less than 30 wt. % of the feed block.

11. The method of claim 1, wherein the feed block includes at least one of one or more sugar alcohols, clay, or one or more feed nuggets.

12. The method of claim 1, wherein the first pH is about 8.0 to about 11.0.

13. The method of claim 1, wherein concentrating the premixture includes concentrating the premixture to a solids content of at least 98 percent by weight.

14. The method of claim 1, wherein concentrating the premixture includes heating the premixture to a temperature of about 230° F. to about 245° F.

15. The method of claim 14, wherein heating the premixture includes heating the mixture under vacuum conditions.

16. The method of claim 1, further comprising pouring the admixture into a vessel.

17. The method of claim 1, further comprising allowing the admixture to cool to 185° F. or below.

18. The method of claim 17, wherein allowing the admixture to cool includes cooling the admixture on a cooling belt or in a jacketed vessel.

19. A method of making a feed block, comprising:
forming a premixture of concentrated separator by-product and added sugar, the concentrated separator by-product forming about 45 to about 60 wt. % of the premixture on a dry matter basis and the sugar forming about 5 to about 30 wt. % on a dry matter basis;
adjusting a pH of the premixture to a first pH with one or more first pH adjusters, wherein the first pH is about 7.0 to about 11.0;
concentrating the premixture to a solids content of at least about 90 percent by weight;
forming an admixture by combining the concentrated premixture with dry components, wherein forming the admixture includes adding one or more second pH adjusters such that the admixture exhibits a second pH that is about the same as the first pH; and
depositing the admixture into a vessel where the deposited admixture hardens at ambient temperatures to thereby form the feed block,
wherein at least one of the one or more first pH adjusters or the one or more second pH adjusters include one or more of sodium hydroxide, magnesium hydroxide, calcium oxide, sodium hydrogen carbonate, or beet filtrate, and
wherein the feed block is substantially free of molasses.

20. A method of making a feed block, comprising:
forming a premixture of concentrated separator by-product and added sugar;
adjusting a pH of the premixture to a first pH with one or more first pH adjusters, wherein the first pH is about 7.0 to about 11.0;
concentrating the premixture;
forming an admixture by combining the concentrated premixture with dry components, wherein forming the admixture includes adding one or more second pH adjusters such that the admixture exhibits a second pH that is about the same as the first pH;

pouring the admixture into a vessel; and allowing the poured admixture to cool to an ambient temperature thereby hardening into a feed block, wherein the feed block is substantially free of molasses.

\* \* \* \* \*